United States Patent [19]

Boeckeler et al.

[11] 4,425,207

[45] Jan. 10, 1984

[54] DUAL CURE COATING COMPOSITIONS

[75] Inventors: Rudolph H. Boeckeler, Grafton; James R. Prom, Port Washington, both of Wis.

[73] Assignee: Freeman Chemical Corporation, Port Washington, Wis.

[21] Appl. No.: 458,304

[22] Filed: Jan. 17, 1983

Related U.S. Application Data

[62] Division of Ser. No. 208,856, Nov. 21, 1980, Pat. No. 4,377,457.

[51] Int. Cl.$^3$ .................. C08F 8/18; C08G 18/00; C08G 2/02
[52] U.S. Cl. ................. 204/159.14; 204/159.16; 204/159.21
[58] Field of Search .................. 204/159.14, 159.16, 204/159.15, 159.19, 159.21

[56] References Cited

U.S. PATENT DOCUMENTS

| | | | |
|---|---|---|---|
| 3,882,007 | 5/1975 | Watanabe et al. | 204/159.19 |
| 4,154,896 | 5/1979 | Sattler et al. | 204/159.19 |
| 4,377,457 | 3/1983 | Boeckler | 204/159.21 |

*Primary Examiner*—Theodore Morris

[57] ABSTRACT

Dual cure coating compositions are prepared by one of the following techniques: aminoplast crosslinking with residual hydroxy present on extended acrylated or UV cure polymers; oxidative crosslinking of backbone drying oil unsaturation following UV cure; or by employing UV chain extension via reaction of pendent allylic group with polymercaptans followed by a melamine heat cure. The coatings are cured by UV exposure followed by heating or air drying.

8 Claims, No Drawings

DUAL CURE COATING COMPOSITIONS

CROSS-REFERENCE TO RELATED APPLICATIONS

This is a division of application Ser. No. 208,856, filed Nov. 21, 1980 now U.S. Pat. No. 4,377,457.

BACKGROUND OF THE INVENTION

1. Field of the Invention

This invention relates to coating compositions which are cured in a two-stage curing process. The first cure is a photopolymerization UV cure, and the second cure is a heat or air drying cure, the second cure preferably being catalyzed by an acid catalyst generated in the initial cure step.

2. Description of the Prior Art

The combined impact of high energy costs and more stringent control regulations restricting emissions of volatile solvents into the atmosphere has created a need in the coatings industry for high solids or solventless systems which do not require a large amount of energy for conversion of the system into a high performance coating.

Coatings are known which offer 100% solids, rapid cure and low conversion energy demand. Examples are the UV or electron beam cured acrylated coatings. These materials, however, are considerably more expensive than solvent or water based coatings and additionally suffer from poor adhesion to many different types of substrates.

The rapid cure from such UV coatings is obtained by using a high concentration of reactive acrylic groups. The exchange of a double bond for two single bonds for every monomer polymerized can result in as much as a 20-30% reduction in volume for a complete polymerization reaction. In addition rapid cure in the absence of high heat, such as occurs in typical UV systems, results in little molecular stress relaxation and consequently poor adhesion to nonporous substrates. The high resin cost stems primarily from the required high concentration of acrylic monomer and the isocyanate or epoxide backbone required for reaction with the acrylic monomer.

UV cured coatings with backbones of the polyester or alkyd types might be employed to reduce shrinkage and reduce cost, but this also results in a decrease in cure response and degradation of cured film properties due to lower cross link densities.

SUMMARY OF THE INVENTION

According to the present invention, three basic approaches to a dual cure system are employed to overcome aforementioned disadvantages of the prior art. The first approach is to employ aminoplast resin crosslinking with residual hydroxy present on extended acrylated UV cure polymers. The second approach is to employ oxidative crosslinking of backbone drying oil unsaturation following UV cure. The third approach is to employ UV chain extension via reaction of pendant allylic groups with polymercaptans followed by a melamine heat cure. The photoinitiator for the reactions of the present invention are preferably those which, upon decomposition, form an acidic material which is suitable as the acid catalyst for the conversion of the aminoplast resin vehicle.

The coating composition of the present invention is cured in two stages. In the first stage, the coating is exposed to ultraviolet radiation to produce a tack free coating. In the second stage, the coating is heated or air dried and the residual acid formed upon decomposition of the polymerization initiator serves to cure the aminoplast or catalyze oxidative polymerization.

DESCRIPTION OF THE PREFERRED EMBODIMENTS

The first approach for a dual cure coating composition according to the present invention comprises aminoplast resin crosslinking with residual hydroxy present on extended acrylated UV cure polymer. A variety of extended acrylates may be employed in the present invention, a few of which are illustrated by the following examples:

EXTENDED ACRYLATE RESIN A

A first extender resin is prepared by charging tetrahydrophthalic anhydride, Polyol 80 and tall oil fatty acid into a kettle in molar ratios of 1.35/1.04/1.0 respectively. Polyol 80 is an 80% glycerin and 20% diol mixture sold by Dow Chemical. The mixture is heated to about 170° C. at which point water is driven off and then to about 220° C. for four to five hours. The heating is continued until the extender product has an acid value of about 65 and a Gardner viscosity of X to Y at 90% non-volatile materials, (nmv) in 10% ethylene glycol monomethyl ether.

Resin A is then prepared by cooling the above mixture to about 100° C. at which point a bisphenol A diepoxide and acrylic acid are added in molar ratios of 1.96 and 3.42 respectively. The particular diepoxide employed by the present inventors was the diglycidyl ether of bisphenol-A, DER-332, a trademarked product of Dow Chemical. The reactants are heated to 110°-120° C. and held at that temperature until the acid value has reached about 9 and the Gardner viscosity has reached a Q value at 90% nmv in ethylene glycol monomethyl ether. The epoxide equivalent weight of the product at this stage exceeds 5000.

EXTENDED ACRYLATE RESIN B

A second extended acrylate resin B was prepared according to the same general procedure outlined above except that the extender comprised tetrahydrophthalic anhydride and diethylene glycol in a molar ratio of 1.57/1.08. Soya fatty acid (1.0 molar ratio) was added with the DER-332 and acrylic acid (molar ratios of 1.92 and 2.11 respectively).

EXTENDED ACRYLATE RESIN C

Extended acrylate resin C was prepared according to the same general procedure except the extender comprised phthalic anhydride, diethylene glycol, Polyol 80 and tall oil fatty acid in molar ratios of 1.39/0.18/1.04/1.0 and the diepoxide and acrylic acid were added in molar ratios of 1.16 and 2.13, respectively.

EXTENDED ACRYLATE RESIN D

Extended acrylate resin D was prepared according to the same general procedure except the extender comprised tetrahydrophthalic anhydride, diethylene glycol, Polyol 80 and tall oil fatty acid in molar ratios of 1.0/0.4/0.5/1.0 and the diepoxide and acrylic acid were added in molar ratios of 1.7 to 3.06 respectively.

EXTENDED ACRYLATE RESIN E

Extended acrylate resin E was prepared according to the same general procedure except the extender comprised phthalic anhydride, diethylene glycol and linseed oil fatty acid in molar ratios of 1.65/1.13/1.0 and the diepoxide and acylic acid were added in molar ratios of 2.0 and 2.3 respectively.

EXTENDED URETHANE ACRYLATE RESIN F

An extended urethane acrylate resin F was also prepared for use in the dual cure coating systems of the present invention. An extender resin was prepared by charging phthalic anhydride, diethylene glycol, Polyol 80 and tall oil fatty acid into a kettle in molar ratios of 1.94/2.17/1.97/1.0, respectively. the mixture was heated to 170° C. where water was removed and then to about 220° C. until the acid value reached 2 or less and the Gardner viscosity measured U at 90% nvm in 10% ethylene glycol monomethyl ether. The product was cooled to 100° C. and removed from the kettle. Toluene diisocyanate in a molar ratio of 1.62 was charged to the kettle and 1.62 molar equivalents of hydroxyethyl acrylate was gradually added to maintain a reaction temperature of about 50°-55° C. The HEA addition took about 1 hour. The product was then heated to 75°-80° and the extender was gradually added, again over about a one hour period, and held for 2-3 hours until the NCO value fell below about 0.1%. At this point the cook was concluded.

It will be appreciated by one skilled in the art after reading the present specification that a wide variety of polyester or alkyd extended epoxy acrylates and urethane acrylates are useful in the present invention and the six examples provided above should be taken as illustrative rather than limiting. It should also be appreciated that other epoxides, diepoxides or mixtures thereof, other ethylenically unsaturated monoacrylic acids, polyols, anhydrides and fatty acids may be employed depending on the particular properties desired of the final product. And finally it should be understood that the specific acid values and viscosity measurements mentioned in some of the examples were specific to these examples and will vary for other examples or can be varied by one practicing the invention to manipulate the desired final properties.

The dual cure coating systems of the present invention will now be illustrated using the six base acrylates described above. Table I illustrates five dual cure coating compositions employing as the base resin the extended epoxy acrylate resin A.

TABLE I

| Component (wt. %) | EXAMPLES | | | | |
|---|---|---|---|---|---|
| | 1 | 2 | 3 | 4 | 5 |
| Resin A | 77.3 | 68.1 | 68.1 | 73.5 | 73.5 |
| V-Pyrol | 15.5 | 13.6 | 13.6 | — | — |
| Trigonal P-1 | 2.0 | 1.8 | — | 2.0 | 2.0 |
| Sandoray 1000 | — | — | 1.8 | — | — |
| Cymel 303 | 5.2 | 4.5 | 1.8 | — | 4.9 |
| 1, 3 Butylene Glycol | — | 11.8 | 11.8 | — | — |
| TEGDA | — | — | — | 19.6 | — |
| Cymel 325 | — | — | — | 4.9 | — |
| HEMA | — | — | — | — | 19.6 |

V-Pyrol is N-vinyl-2 pyrrolidone and is added as a reactive diluent for the UV cure. Trigonal P-1 is 2, 2, 2 trichloro t-butyl acetophenone and is manufactured by Noury Chemical Co. This material releases HCl during the UV cure which in turn catalyzes the melamine reaction. Sandoray 1000 is 2,2 dichlorophenoxyacetophenone Sandoz Colors and Chemicals and performs the same function as Trigonal P-1. Cymel 303 is hexamethoxymethylmelamine manufactured by American Cyanamid. TEGDA is tetraethyleneglycoldiacrylate and HEMA is hydroxyethylmethacrylate. These two materials are employed to reduce viscosity and modify final properties. Finally, Cymel 325 is a partially alkylated melamine formaldehyde sold by American Cyanamid.

To test the dual cure systems described in Examples 1–5, coatings were drawn down with a 1.5 mil. Bird applicator on Bonderite 100 treated steel panels and cured by exposure to UV in air under 200 watt per inch Hanovia medium pressure mercury vapor lamps (2 passes at 10 ft. per min.—2 lamps). Pencil hardness and resistance were tested after the UV cure. A post bake of 5 minutes at 300° F. was then carried out on the coatings and additional hardness, resistance and impact tests were performed. The performance of the samples is illustrated in Table II.

TABLE II

| | EXAMPLES | | | | |
|---|---|---|---|---|---|
| | 1 | 2 | 3 | 4 | 5 |
| Performance UV | | | | | |
| Pencil Hardness | HB | H | H | H | H |
| Methyl Ethyl Ketone (double rubs) | 80 | 25 | 25 | 30 | 30 |
| Performance UV & Post Bake | | | | | |
| Pencil Hardness | 4H | 4H | 4H | 2H | 2H |
| MEK (double rubs) | >100 | >100 | >100 | 100 | 100 |
| Gardner Impact (in-lbs) | | | | | |
| forward | 20 | | | 20 | 20 |
| reverse | 2 | | | 2 | 2 |

Table III illustrates five dual cure coating compositions employing as the base resin the extended epoxy acrylate resin B. Performance tests are also shown.

TABLE III

| Component (wt. %) | EXAMPLE | | | | |
|---|---|---|---|---|---|
| | 6 | 7 | 8 | 9 | 10 |
| Resin B | 81.9 | 81.9 | 64.1 | 67.1 | 67.1 |
| TPGDA | — | — | 17.1 | — | — |
| PETA | — | — | — | 17.9 | — |
| V-Pyrol | — | — | — | — | 17.9 |
| Ethylene Glycol | 8.6 | 8.6 | 8.6 | — | — |
| Tridecyl Alcohol | — | — | — | 8.9 | — |
| Cymel 325 | 8.6 | 8.6 | 8.6 | 4.5 | 4.5 |
| Trigonal P-1 | 1.7 | 1.7 | 1.7 | 1.5 | 1.5 |
| 1,3 Butylene Glycol | — | — | — | — | 8.9 |
| Performance UV | | | | | |
| Pencil Hardness | <4B | <4B | <4B | <4B | <4B |
| MEK (double rubs) | 10 | 10 | 15 | 20 | 10 |
| Performance UV & Post Bake | | | | | |
| Pencil Hardness | HB | 2H | 2H | H | 2H |
| MEK (double rubs) | 80 | 100 | 100 | 100 | 80 |
| Crosshatch adhesion (% Loss) | 100 | 25–30 | 100 | — | 50 |
| Impact (in.-lbs) | | | | | |
| forward | — | 40 | — | 20 | 60 |
| reverse | — | 30 | — | 2 | 10 |

In examples 6–10 TPGDA is tripropylene glycol diacrylate which acts as a reactive diluent for UV cure to lower viscosity. Similarly, PETA or pentaerythritol triacrylate is also used for reducing viscosity. The glycols and alcohols are used to further reduce viscosity and to provide additional sites for reaction with melamine formaldehyde.

Additional dual cure coating compositions employing the extended epoxy acrylate resins D-F are illustrated in Table IV. Performance is also shown.

TABLE IV

| Component (wt. %) | EXAMPLE 11 | EXAMPLE 12 | EXAMPLE 13 |
|---|---|---|---|
| Resin C | 63.5 | — | — |
| Resin D | — | 77.3 | — |
| Resin F | — | — | 89.3 |
| TPGDA | 16.9 | 15.5 | — |
| Trigonal P-1 | 1.7 | — | 1.7 |
| Ethylene Glycol | 8.5 | — | — |
| LTX 125 | 9.4 | — | — |
| Cymel 325 | — | 5.2 | 8.9 |
| Diacetone Alcohol | — | — | 8.9 |
| Sandoray 1000 | — | 2.0 | — |
| UV Performance | | | |
| Pencil Hardness | <4B | 4B | <4B |
| Crosshatch adhesion (% loss) | — | 100 | 100 |
| MEK (double rubs) | 10 | 30 | — |
| Performance UV & Post Bake | | | |
| Pencil Hardness | H | F | H |
| Crosshatch adhesion (% loss) | 0 | 0 | 100 |
| MEK (double rubs) | >100 | 100 | 60 |
| Impact (in.-lbs) | | | |
| forward | 30 | — | 35 |
| reverse | 2 | — | — |

In Examples 11–13 LTX 125 is a melamine formaldehyde manufactured by Monsanto. Diacetone alcohol is employed in Example 13 for viscosity control.

The second basic approach for dual cure coating systems covered by the present invention comprises oxidative crosslinking of backbone drying oil unsaturation following UV cure. The following Examples 14–16 illustrate such systems employing base resin E described above. Properties are also illustrated in Table V for various film thicknesses and drying times.

TABLE V

| Components (wt. %) | EXAMPLES 14 | EXAMPLES 15 | EXAMPLES 16 |
|---|---|---|---|
| Resin E | 76.5 | 67.0 | 67.0 |
| TMPTA | 20.4 | 15.5 | 15.5 |
| TEGDA | — | 15.5 | — |
| V-Pyrol | — | — | 15.5 |
| Trigonal P-1 | 2.0 | 2.0 | 2.0 |
| Active 8 Drier | 0.3 | — | — |
| Manganese 6% | 0.8 | — | — |
| Performance After UV Cure (0.4–0.5 mil.) | | | |
| Pencil Hardness | | | |
| Initial | 2B | B | 2H |
| 1 Day | 2H | 2H | 4H |
| 4 Days | 4H | 4H | — |
| Crosshatch Adhesion (% Loss) | | | |
| Initial | 0 | 0 | 0 |
| 1 Day | 0 | 0 | 0 |
| 4 Day | 50 | 0 | — |
| MEK (double rubs) | | | |
| Initial | 5 | 10 | 10 |
| 1 Day | 20 | 15 | 10 |
| 4 Day | 25 | 20–30 | — |
| Performance After UV Cure (1.5 mils) | | | |
| Pencil Hardness | | | |
| Initial | 4B | | |
| 1 Day | 4B | | |
| 4 Days | 3B | | |

It is noted in these examples that driers are not necessary to bring about desired properties and that film thickness is a significant factor indicating that further crosslinking is primarily oxidative.

The final dual cure system according to the present invention comprises the reaction of pendant allylic groups with polymercaptans followed by a melamine bake. The base resin (Resin G) for purposes of illustrating this approach consists of the reaction product of 4 equivalents of benzophenonetetracarboxylic dianhydride with 1 equivalent of hydroxy ethylacrylate, 1 equivalent of a polyester polyol and 2 equivalents of allyl glycidyl ether. The mercaptan component is pentaerythritol tetra (3 mercaptoproprionate) referred to as PE (3MP) in Table VI. Testing was done on 0.4–0.5 mil. thick films on cold rolled steel.

TABLE VI

| Components (wt. %) | EXAMPLES 17 | EXAMPLES 18 | EXAMPLES 19 |
|---|---|---|---|
| Resin G | 80.6 | 75.8 | 70.4 |
| PE (3 MP) | 19.4 | 18.2 | 16.9 |
| Cymel 303 | — | 5.3 | 4.2 |
| 1,3 Butylene Glycol | — | — | 7.0 |
| Sandoray 1000 | — | 1.7 | 1.4 |
| Performance UV - 1 pass w/10 ft/min - 1 lamp | | | |
| Pencil Hardness | H | H | B |
| Crosshatch Adhesion (% Loss) | 50 | 50 | 0 |
| MEK (double rubs) | 10–20 | 20–30 | 5 |
| Performance UV & 5 min. Bake at 300° F. | | | |
| Pencil Hardness | | 6H | 7H |
| Crosshatch Adhesion (% Loss) | | 50 | 0 |
| MEK (double rubs) | | 80–100 | 100 |
| Impact (in.-lbs) | | | |
| forward | | | 160 |
| reverse | | | 150 |

It is noted from comparing Examples 17 and 18 that the additional melamine bake provides further crosslinking through residual hydroxy groups resulting in a harder, more solvent resistant film with no sacrifice in adhesion. Example 19 shows that further improvements are obtained by adding more hydroxyl bearing species.

While a variety of examples of dual cure coating compositions have been described in the foregoing specifications, it should be appreciated that a number of different additives may be employed in the coating compositions as is known to the art. Brighteners, fillers, pigments, dyes, surfactants and flow and leveling additives may be included if desired. It should also be appreciated that while melamine formaldehyde resins are used in the examples as the aminoplast component, other aminoplasts such as ureaformaldehydes, glycolurils and benzoguanamines may also be employed.

The coatings of the present invention may be employed in a wide variety of applications such as for coating metals (bottle caps, beverage cans, etc.), as a floor tile protective coating, in vinyl wall coverings, etc.

While the invention has been described in connection with certain examples, it is not to be limited thereby but is to be limited solely by the claims which follow.

We claim:
1. A coating composition comprising:
an epoxy modified polyester extended acrylate resin containing plural beta hydroxy alkyl acrylate groups and drying oil unsaturation; and
a photopolymerization initiator for said resin, said initiator being selected from those initiators which decompose upon exposure to U.V. radiation to generate an acid catalyst for the cross-linking reaction of said resin.

2. The composition set forth in claim 1 wherein said extender comprises the reaction product of linseed oil fatty acid.

3. A method for curing the coating composition of claim 1 comprising exposing the composition to ultraviolet radiation and air curing the composition to permit oxidative crosslinking of the backbone drying oil unsaturation.

4. A method for curing the coating composition of claim 2 comprising exposing the composition to ultraviolet radiation and air curing the composition to permit oxidative crosslinking of the backbone drying oil unsaturation.

5. A coating composition comprising:
a first resin containing pendent allyl groups;
a polymercaptan reactive with said allylic groups of said first resin;
a polymerization initiator for said reaction between said first resin and said polymerization;
an aminoplast resin; and
an acid catalyst for the reaction of said aminoplast resin and the reaction product of said polymerization and said first resin.

6. The composition set forth in claim 5 wherein said catalyst consists at least in part of the decomposition product of said polymerization initiator.

7. A method of curing the composition of claim 5 comprising exposing the composition to ultraviolet radiation and subsequently heating the composition to react the aminoplast resin with the ultraviolet radiation cured material.

8. A method of curing the composition of claim 6 comprising exposing the composition to ultraviolet radiation and subsequently heating the composition to react the aminoplast resin with the ultraviolet radiation cured material.

* * * * *